United States Patent
Browne et al.

(10) Patent No.: US 7,332,688 B2
(45) Date of Patent: Feb. 19, 2008

(54) ACTIVE MATERIAL BASED LOCKOUT MECHANISMS

(75) Inventors: Alan L. Browne, Grosse Pointe, MI (US); Nancy L. Johnson, Northville, MI (US); Michael R. Leslie, Grosse Pointe Park, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/357,916

(22) Filed: Feb. 17, 2006

(65) Prior Publication Data
US 2006/0186706 A1    Aug. 24, 2006

Related U.S. Application Data

(60) Provisional application No. 60/654,311, filed on Feb. 19, 2005.

(51) Int. Cl.
*H01H 1/10* (2006.01)
(52) U.S. Cl. .................. 200/512; 200/520; 200/341
(58) Field of Classification Search .............. 200/512
See application file for complete search history.

(56) References Cited

U.S. PATENT DOCUMENTS

| | | | | |
|---|---|---|---|---|
| 3,303,290 A | * | 2/1967 | Suloway | 379/360 |
| 5,674,018 A | * | 10/1997 | Kaufman et al. | 400/473 |
| 6,552,288 B2 | * | 4/2003 | Ono | 200/512 |
| 6,982,630 B2 | * | 1/2006 | Beckwith et al. | 340/407.1 |
| 2004/0227359 A1 | | 11/2004 | Coleman et al. | 292/254 |

* cited by examiner

*Primary Examiner*—Elvin Enad
*Assistant Examiner*—Lheiren Mae A. Anglo

(57) ABSTRACT

Control mechanisms and methods of use include the use of active materials as a blocking element. The control mechanisms generally include a tactile control in operative communication with an electrical circuit, wherein actuation of the tactile control closes the electrical circuit to activate a function. The blocking element includes an active material that is intermediate to the electrical circuit and the tactile control. The active material is adapted to change at least one attribute such as a modulus property in response to an activation signal. The change in the at least one attribute selectively changes a force level for actuating the tactile control.

21 Claims, 1 Drawing Sheet

ACTIVE MATERIAL BASED LOCKOUT MECHANISMS

CROSS REFERENCE TO RELATED APPLICATIONS

The present application claims the benefit of Provisional Application No. 60/654,311 filed on Feb. 19, 2005, incorporated herein by reference in their entirety.

BACKGROUND

The present disclosure generally relates to active material based lockout mechanisms.

Numerous automotive vehicles employ one or more vehicle control mechanisms to operate specific functions in or out of the vehicle. For example, control mechanisms can be individual controls used to activate, among others, door locks, power windows, seats, mirrors, the trunk lid, the hood, and the like. Very often these individual controls are located within the interior of the vehicle in close proximity to the vehicle operator. Current individual vehicle control interfaces are generally in the form of a switch, a button, a handle, a lever, or a knob that is rotated, pushed, and/or pulled. A limitation of the current vehicle controls is that they may be easily activated with a minimal amount of force. This can be problematic since a child or animal may unlock the door or open the window or a vehicle operator may unintentionally operate the individual control.

Most automotive vehicles employ vehicle control mechanisms such as latch systems designed to lock down a closure at a single point. For example, latches are used on a glove box compartment or a console center. The latch systems generally provide a mechanism for locking and unlocking the compartment. They are primarily used for locking down and forming a closure to prevent unintentional opening even among impacts. Typically, the latch system includes a striker on the closure and a primary latching member on the vehicle body engageable with the striker to secure the pivotable closure in the closed position. A limitation of the current closure latch systems is that the striker may be unexpectedly disengaged from the latch upon an impact occurrence or inertia force. Another limitation is that the closure latch system is rather easily accessible by others.

Accordingly, there remains a need in the art for improved vehicle control mechanisms and methods that prevent unintentional operation as well as provide greater protection against unauthorized access to compartments. It would be particularly advantageous if the vehicle control mechanisms were reversible on demand to lockout access to the vehicle control mechanisms.

BRIEF SUMMARY

Disclosed herein are control mechanisms and methods of use utilizing an active material. In one embodiment, the control mechanism comprises a tactile control in operative communication with an electrical circuit, wherein actuation of the tactile control closes the electrical circuit to activate a function; a blocking element comprising an active material intermediate the electrical circuit and the tactile control, wherein the active material is adapted to change at least one attribute in response to an activation signal; an activation device in operative communication with the active material adapted to provide the activation signal, wherein the change in the at least one attribute changes a modulus property of the blocking element and changes a force level for actuating the tactile control; and a controller in operative communication with the activation device.

In another embodiment, a process for selectively adjusting a force level for a tactile control in operative communication with an electrical circuit, wherein actuation of the tactile control closes the electrical circuit to activate a function comprise selectively changing a modulus property of a blocking element by applying an activation signal, wherein the blocking element comprises an active material intermediate the electrical circuit and the tactile control, wherein the active material is adapted to change the modulus property in response to the activation signal.

The above described and other features are exemplified by the following figures and detailed description.

BRIEF DESCRIPTION OF THE DRAWINGS

Referring now to the figures, which are exemplary embodiments and wherein like elements are numbered alike.

DETAILED DESCRIPTION

Figure 1:
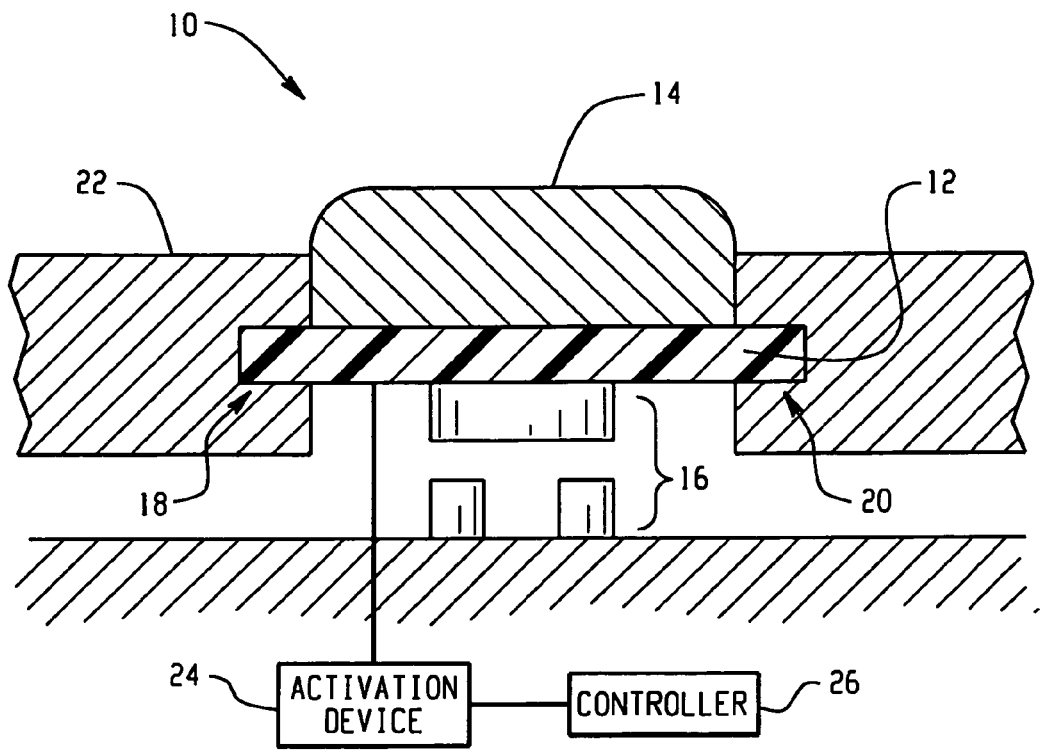
FIG. 1 is a schematic representation of a cross-section of a membrane switch in accordance with one embodiment of the disclosure.

The present disclosure generally relates to control mechanisms and methods of use, and in particular, to control mechanisms comprising an active material that changes at least one attribute in response to an activation signal. For convenience, reference will be made to control mechanisms for vehicles. It will be apparent to those skilled in the art that the active material based control mechanisms can be utilized in a variety of non-automotive applications such as computers, electronic stoves, and dishwashers, as examples employing switches, keyboards, and the like as described herein. The active material provides a means for reversible on-demand lockout/disabling of the vehicle control mechanisms. The active materials are preferably employed as actuators disposed within the vehicle control mechanism to undergo the change in at least one attribute. Although reference will made herein to automotive applications, it is contemplated that the control mechanisms can be employed in any environment where a controllable switch, latch, knob, button, toggle, or the like is employed, e.g., desirable airplanes, trains, buses, trucks, vans, recreational vehicles, home appliances, child security devices, and the like.

As used herein, the term "vehicle control mechanism" generally refers to various tactile control devices that control different functions of the vehicle, which include, but are not limited to, individual controls such as switches, knobs, buttons, toggles, and the like. These individual controls are typically used to operate door locks, power locks, power windows, power sliding doors, power mirrors, power seats, glove compartment latches, console latches, trunk access latches, and the like. Other suitable devices will be apparent to those skilled in the art in view of this disclosure.

The vehicle control mechanism generally comprises an active material that is adapted to undergo a change in at least one attribute in response to an activation signal. The term "active material" as used herein refers to several different classes of materials all of which exhibit a change in at least one attribute such as dimension, shape, and/or flexural modulus when subjected to at least one of many different types of applied activation signals, examples of such signals being thermal, electrical, magnetic, mechanical, pneumatic, and the like. One class of active materials is shape memory materials. These materials exhibit a shape memory effect. Specifically, after being deformed pseudoplastically, they can be restored to their original shape in response to the activation signal. Suitable shape memory materials include, without limitation, shape memory alloys (SMA), ferromagnetic SMAs, and shape memory polymers (SMP). A second class of active materials can be considered as those that exhibit a change in at least one attribute when subjected to an applied activation signal but revert back to their original state upon removal of the applied activation signal. Active materials in this category include, but are not limited to, piezoelectric materials, electroactive polymers (EAP), magnetorheological fluids and elastomers (MR), electrorheological fluids (ER), composites of one or more of the foregoing materials with non-active materials, combinations comprising at least one of the foregoing materials, and the like.

During operation, the active material can be configured to actuate or lockout a control function. In applications where the active materials are integrated into the vehicle control mechanism, the materials integrated with the active material are preferably those materials already utilized for the intended application. In one embodiment, the active material may form localized regions, films, layers or coatings that cooperatively and selectively change at least one attribute of a vehicle control mechanism depending on the desired application.

In other embodiments, the active material can be in the form of a linkage, spring, band, or the like to define a component of the actuator. In these embodiments, the active material forms a physical mechanical link. For example, a lever based actuator can include a linkage formed of the activate material. When the active material is activated and in its lower modulus state, for example, the lever can be configured to not provide an effective amount of displacement and force, thereby disabling the control mechanism.

By utilizing the active material in the vehicle control mechanism, selectively applying an activation signal to the active material can effect a change in a property of the active material on demand, which change can be by itself either fully reversible or may include a biasing mechanism to provide reversibility, e.g., a biasing return spring in parallel to the SMA. Suitable activation signals will depend on the type of the active material. As such, the activation signal provided for reversibly changing at least one attribute of the vehicle control mechanism may include a mechanical load, a heat signal, an electrical signal, a magnetic signal and combinations comprising at least one of the foregoing signals, and the like.

Referring now to FIG. 1, there is shown an exemplary vehicle control in the form of a switch generally designated 10, which is suitable to open or close an electrical circuit in operative communication therewith to operate a desired function of the vehicle, e.g., interior or exterior lights, trunk release, power lock, power window, and the like. The present disclosure is not intended to be limited to the specific type of vehicle control 10 as shown or to the control of any particular function. The vehicle control can be configured in a variety of ways as will be apparent to those in the art in view of this disclosure. For example, the vehicle control can be configured as a toggle, knob, button, and the like.

For the switch application, the vehicle control 10 generally includes a membrane 12 formed of the active material intermediate a depressible control button 14 and an electrical circuit 16, all of which can be disposed within a housing (not shown), e.g., a power window switch disposed in an arm rest. Each end 18, 20 of the membrane 12 is seated in a stationary support structure 22 in which the depressible control button 14 is slidably engaged. The active material of the membrane 12 is in operative communication with an activation device 24 and a controller 26. The controller 26 is adapted to accept various input signals from devices such as sensors (not shown), which can be used to determine, for example, the pressure load on the control button, the weight of the occupant seated most proximate to the control switch, and the like as may be desired. The controller 26 processes the input information and then sends an appropriate signal to the activation device 24, which selectively provides the activation signal to the active material. The active material changes at least one attribute in response to the activation signal.

By way of example, the membrane 12 can be formed of a shape memory polymer, the general behavior of which is described in greater detail below. In operation, the shape memory polymer would either be relatively stiff in the unpowered state (e.g., low temperature) or soft and flexible in the powered state (e.g., high temperature). In this manner, the membrane 12 can be used to variously lock or set the force levels required to depress the control button 14 and actuate the electrical circuit for operating a function. For example, a child lock switch (not shown) in operative communication with the controller 20 can be actuated by the operator to prevent a child from depressing the control button 14. The force levels defined by the modulus properties of the shape memory polymer are selected to prevent depression of the control button by a force/pressure typically associated with a child. The operator or user, however, can still depress the control button so long as the force/pressure exceeds that defined by the shape memory polymer in the unpowered state. In this manner, the shape memory polymer membrane 12 is dimensioned to be flexible enough to allow low force deformation/displacement and would otherwise be stiff in its higher modulus lower temperature state to prevent depression of the control button except under the force levels provided by an adult, for example. Optionally, the active material can be selected to be sufficiently stiff in the unpowered state so as to completely block depression of the control button, for example. The SMP is stiff in a straight configuration such that the window and door switches are not accessible by depression of the membrane. A master control to thermally activate the SMP membrane in these switches causes the at least one active member to change to a low modulus state. Therefore, the window and door switches are "released" on demand giving access to users to operate the responding functions such as, windows, sliding doors and door locks. Still further, the SMP can be configured for switches located on the console, preventing a child or an animal from unintentionally operating power windows, fuel release doors and the like located on the console. The SMP is configured of certain stiffness to prevent unintentional operations of these functions.

Although a membrane has been shown, other forms and shapes are contemplated and suitable for use in the present disclosure. Preferably, the active material is configured to provide a means for blocking or for selectively varying the force levels associated with the binary function of a switch. For example, a magnetorheological or electrorheological fluid can be used in which the fluid under switch membrane flows out through a channel/orifice. Applying a magnetic field (or electric field as in the case of electrorheological fluids) across the channel will block flow, thereby preventing movement of membrane. The control mechanism can be designed to either be activated only when fluid flow is permitted or when it is not permitted.

It should be understood that the following embodiments employing the active material would include an activation device controlled by a controller for selectively providing a suitable activation signal to the active material unless otherwise noted. In some embodiments, pseudoplastic deformation can occur by a mechanical loading.

Figure 2:
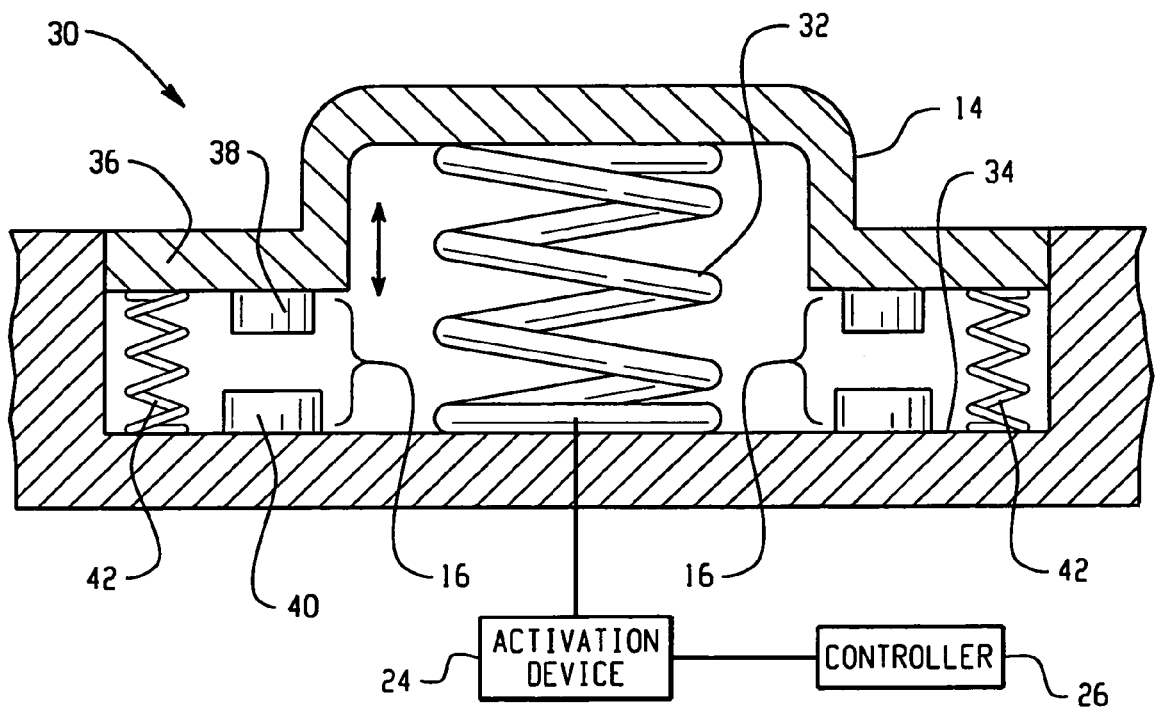
FIG. 2 is a schematic representation of a cross-section of a membrane switch in accordance with another embodiment of the disclosure.

In other embodiments, a depressible button switch generally designated 30 includes a spring 32 formed of the active material intermediate the button 14 and rigid, stationary surface 34 as shown in FIG. 2. In the embodiment shown, the button 34 includes a flange 36, which includes a first contact 38 of the electrical circuit 16 on a bottom surface. A second contact 40 is disposed on the stationary surface. Contact of the first contact with the second contact completes the electrical circuit and actuates a function. A function is activated when a force is exerted on the button to connect the moveable contacts 38 with the stationary contacts 40. By employing a spring formed of the active material the force level to compress the button can be selectively varied as previously described. For example, the spring can be formed of a shape memory alloy. Depending on the particular active material employed, an optional bias spring 42 or the like may be used to provide a restoring force.

In still other embodiments, the superelasticity properties of a shape memory alloy are utilized in a manner similar to that discussed with respect to the shape memory polymers. Superelasticity refers to stress induced transformation for the shape memory alloy from its higher modulus so-called austenite phase to its lower modulus so-called martensite phase with a reversal and return to its original geometry and phase upon release of the activating stress. The geometry of the shape memory alloy would be chosen such that the pressures exerted by children, for example, would be insufficient to cause the stress induced phase transition and thus softening the shape memory alloy with resulting switch activation while still allowing activating under higher pressure loadings of which adults are capable of exerting.

In another example, the switches comprising of SMA and SMP would exhibit a fail-safe mode such that under high temperatures would allow operation of window and door lock functions. For example, in the event of a car fire, car overheating in interior with doors and windows locked, the SMA and SMP would permit access to these operating functions.

Although reference has been made to switches, other types of tactile control devices include a latch to lock and unlock compartments. The latch generally includes of at least one active material in the rod and/or springs of the typical latch assembly. In a locked state, the pin is engaged with the latch. This is highly desirable to prevent theft and unintentional openings upon impact occurrences. On demand, an activation signal to the at least one active material compresses the rod and/or springs disengaging the pin from the latch. In another alternative, the rod is only formed of at least one active material.

In another example, the latch comprises a pin, a gate, at least one active material, and an activation device. The pin may be disposed on the glove compartment with the gate disposed on the vehicle body. Alternatively, the pin may be disposed on the vehicle body with the gate disposed on the glove compartment. The pin and the gate are engageable with each other and can be of any size, shape, or composition. The at least one active material is in operative communication with either the pin or the gate and the activation device is in operative communication with the at least one active material.

In yet another example, the control mechanism is an SMA actuator to release a pin-latch mechanism in a glove box compartment. When the pin is in an engagement position with the latch, the glove box door is closed. Upon triggering a push button to the SMA actuator, the SMA actuates by retracting the spring in an unwind direction, disengaging the pin from the latch, opening the glove box door. The positions designating open and closed doors can be interchanged. This prevents unintentional opening during impact occurrences and unauthorized access.

In one example, the actuator has a first shape, of a certain dimension and/or stiffness and is operative to change to a second shape, dimension and/or stiffness by providing a change in closure release strength in response to the activation signal. The actuator is in operative communication with the closure latch system. The vehicle control mechanism or actuator can take many forms depending on the at least one active material. For example, the vehicle control mechanism or actuator can be comprised of shape memory alloy springs, piezoelectric ceramic patches, ferromagnetic or magnetorheological fluid containing rubber seals, electroactive polymer seals, and the like.

The various examples provided herein are merely exemplary and are not intended to be limiting. The control mechanisms advantageously provide selective activation of switches, protects against unintentional operation of switches, and provides secure engagement on closures on a vehicle.

Shape memory polymers (SMPs) generally refer to a group of polymeric materials that demonstrate the ability to return to some previously defined shape when subjected to an appropriate thermal stimulus. Shape memory polymers may be thermoresponsive (i.e., the change in the property is caused by a thermal activation signal), photoresponsive (i.e., the change in the property is caused by a light-based activation signal), moisture-responsive (i.e., the change in the property is caused by a liquid activation signal such as humidity, water vapor, or water), or a combination comprising at least one of the foregoing.

Generally, SMPs are phase segregated co-polymers comprising at least two different units, which may be described as defining different segments within the SMP, each segment contributing differently to the overall properties of the SMP. As used herein, the term "segment" refers to a block, graft, or sequence of the same or similar monomer or oligomer units, which are copolymerized to form the SMP. Each segment may be crystalline or amorphous and will have a corresponding melting point or glass transition temperature (Tg), respectively. The term "thermal transition temperature" is used herein for convenience to generically refer to either a Tg or a melting point depending on whether the segment is an amorphous segment or a crystalline segment. For SMPs comprising (n) segments, the SMP is said to have a hard segment and (n-1) soft segments, wherein the hard segment has a higher thermal transition temperature than any soft segment. Thus, the SMP has (n) thermal transition temperatures. The thermal transition temperature of the hard segment is termed the "last transition temperature", and the lowest thermal transition temperature of the so-called "softest" segment is termed the "first transition temperature". It is important to note that if the SMP has multiple segments characterized by the same thermal transition temperature, which is also the last transition temperature, then the SMP is said to have multiple hard segments.

When the SMP is heated above the last transition temperature, the SMP material can be imparted a permanent shape. A permanent shape for the SMP can be set or memorized by subsequently cooling the SMP below that temperature. As used herein, the terms "original shape", "previously defined shape", and "permanent shape" are synonymous and are intended to be used interchangeably. A temporary shape can be set by heating the material to a temperature higher than a thermal transition temperature of any soft segment yet below the last transition temperature, applying an external stress or load to deform the SMP, and then cooling below the particular thermal transition temperature of the soft segment while maintaining the deforming external stress or load.

The permanent shape can be recovered by heating the material, with the stress or load removed, above the particular thermal transition temperature of the soft segment yet below the last transition temperature. Thus, it should be clear that by combining multiple soft segments it is possible to demonstrate multiple temporary shapes and with multiple hard segments it may be possible to demonstrate multiple permanent shapes. Similarly using a layered or composite approach, a combination of multiple SMPs will demonstrate transitions between multiple temporary and permanent shapes.

For SMPs with only two segments, the temporary shape of the shape memory polymer is set at the first transition temperature, followed by cooling of the SMP, while under load, to lock in the temporary shape. The temporary shape is maintained as long as the SMP remains below the first transition temperature. The permanent shape is regained when the SMP is once again brought above the first transition temperature with the load removed. Repeating the heating, shaping, and cooling steps can repeatedly reset the temporary shape.

Most SMPs exhibit a "one-way" effect, wherein the SMP exhibits one permanent shape. Upon heating the shape memory polymer above a soft segment thermal transition temperature without a stress or load, the permanent shape is achieved and the shape will not revert back to the temporary shape without the use of outside forces.

As an alternative, some shape memory polymer compositions can be prepared to exhibit a "two-way" effect, wherein the SMP exhibits two permanent shapes. These systems include at least two polymer components. For example, one component could be a first cross-linked polymer while the other component is a different cross-linked polymer. The components are combined by layer techniques, or are interpenetrating networks, wherein the two polymer components are cross-linked but not to each other. By changing the temperature, the shape memory polymer changes its shape in the direction of a first permanent shape or a second permanent shape. Each of the permanent shapes belongs to one component of the SMP. The temperature dependence of the overall shape is caused by the fact that the mechanical properties of one component ("component A") are almost independent of the temperature in the temperature interval of interest. The mechanical properties of the other component ("component B") are temperature dependent in the temperature interval of interest. In one embodiment, component B becomes stronger at low temperatures compared to component A, while component A is stronger at high temperatures and determines the actual shape. A two-way memory device can be prepared by setting the permanent shape of component A ("first permanent shape"), deforming the device into the permanent shape of component B ("second permanent shape"), and fixing the permanent shape of component B while applying a stress.

It should be recognized by one of ordinary skill in the art that it is possible to configure SMPs in many different forms and shapes. Engineering the composition and structure of the polymer itself can allow for the choice of a particular temperature for a desired application. For example, depending on the particular application, the last transition temperature may be about 0° C. to about 300° C. or above. A temperature for shape recovery (i.e., a soft segment thermal transition temperature) may be greater than or equal to about −30° C. Another temperature for shape recovery may be greater than or equal to about 40° C. Another temperature for shape recovery may be greater than or equal to about 100° C. Another temperature for shape recovery may be less than or equal to about 250° C. Yet another temperature for shape recovery may be less than or equal to about 200° C. Finally, another temperature for shape recovery may be less than or equal to about 150° C.

Although reference has been, and will further be, made to thermoresponsive SMPs, those skilled in the art in view of this disclosure will recognize that photoresponsive, moisture-responsive SMPs and SMPs activated by other methods may readily be used in addition to or substituted in place of thermoresponsive SMPs. For example, instead of using heat, a temporary shape may be set in a photoresponsive SMP by irradiating the photoresponsive SMP with light of a specific wavelength (while under load) effective to form specific crosslinks and then discontinuing the irradiation while still under load. To return to the original shape, the photoresponsive SMP may be irradiated with light of the same or a different specific wavelength (with the load removed) effective to cleave the specific crosslinks. Similarly, a temporary shape can be set in a moisture-responsive SMP by exposing specific functional groups or moieties to moisture (e.g., humidity, water, water vapor, or the like) effective to absorb a specific amount of moisture, applying a load or stress to the moisture-responsive SMP, and then removing the specific amount of moisture while still under load. To return to the original shape, the moisture-responsive SMP may be exposed to moisture (with the load removed).

Suitable shape memory polymers, regardless of the particular type of SMP, can be thermoplastics, thermosets-thermoplastic copolymers, interpenetrating networks, semi-interpenetrating networks, or mixed networks. The SMP "units" or "segments" can be a single polymer or a blend of polymers. The polymers can be linear or branched elastomers with side chains or dendritic structural elements. Suitable polymer components to form a shape memory polymer include, but are not limited to, polyphosphazenes, poly(vinyl alcohols), polyamides, polyimides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly (ethyl methacrylate), poly(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecylacrylate). Examples of other suitable polymers include polystyrene, polypropylene, polyvinyl phenol, polyvinylpyrrolidone, chlorinated polybutylene, poly(octadecyl vinyl ether), poly (ethylene vinyl acetate), polyethylene, poly(ethylene oxide)-poly(ethylene terephthalate), polyethylene/nylon (graft copolymer), polycaprolactones-polyamide (block copolymer), poly(caprolactone) dimethacrylate-n-butyl acrylate, poly(norbornyl-polyhedral oligomeric silsequioxane), polyvinylchloride, urethane/butadiene copolymers, polyurethane-containing block copolymers, styrene-butadiene block copolymers, and the like. The polymer(s) used to form the various segments in the SMPs described above are either commercially available or can be synthesized using routine chemistry. Those of skill in the art can readily prepare the polymers using known chemistry and processing techniques without undue experimentation.

As will be appreciated by those skilled in the art, conducting polymerization of different segments using a blowing agent can form a shape memory polymer foam, for example, as may be desired for some applications. The blowing agent can be of the decomposition type (evolves a gas upon chemical decomposition) or an evaporation type (which vaporizes without chemical reaction). Exemplary blowing agents of the decomposition type include, but are not intended to be limited to, sodium bicarbonate, azide compounds, ammonium carbonate, ammonium nitrite, light metals which evolve hydrogen upon reaction with water, azodicarbonamide, N,N' dinitrosopentamethylenetetramine, and the like. Exemplary blowing agents of the evaporation type include, but are not intended to be limited to, trichloromonofluoromethane, trichlorotrifluoroethane, methylene chloride, compressed nitrogen, and the like.

Shape memory alloys are alloy compositions with at least two different temperature-dependent phases. The most commonly utilized of these phases are the so-called martensite and austenite phases. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature ($A_s$). The temperature at which this phenomenon is complete is called the austenite finish temperature ($A_f$). When the shape memory alloy is in the austenite phase and is cooled, it begins to change into the martensite phase, and the temperature at which this phenomenon starts is referred to as the martensite start temperature ($M_s$). The temperature at which austenite finishes transforming to martensite is called the martensite finish temperature ($M_f$). It should be noted that the above-mentioned transition temperatures are functions of the stress experienced by the SMA sample. Specifically, these temperatures increase with increasing stress. In view of the foregoing properties, deformation of the shape memory alloy is preferably at or below the austenite transition temperature (at or below $A_s$). Subsequent heating above the austenite transition temperature causes the deformed shape memory material sample to revert back to its permanent shape. Thus, a suitable activation signal for use with shape memory alloys is a thermal activation signal having a magnitude that is sufficient to cause transformations between the martensite and austenite phases.

The temperature at which the shape memory alloy remembers its high temperature form when heated can be adjusted by slight changes in the composition of the alloy and through thermo-mechanical processing. In nickel-titanium shape memory alloys, for example, it can be changed from above about 100° C. to below about −100° C. The shape recovery process can occur over a range of just a few degrees or exhibit a more gradual recovery. The start or finish of the transformation can be controlled to within a degree or two depending on the desired application and alloy composition. The mechanical properties of the shape memory alloy vary greatly over the temperature range spanning their transformation, typically providing shape memory effect, superelastic effect, and high damping capacity. For example, in the martensite phase a lower elastic modulus than in the austenite phase is observed. Shape memory alloys in the martensite phase can undergo large deformations by realigning the crystal structure arrangement with the applied stress. As will be described in greater detail below, the material will retain this shape after the stress is removed.

Suitable shape memory alloy materials for use in the panel include, but are not intended to be limited to, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. The alloys can be binary, ternary, or any higher order so long as the alloy composition exhibits a shape memory effect, e.g., change in shape, orientation, yield strength, flexural modulus, damping capacity, superelasticity, and/or similar properties. Selection of a suitable shape memory alloy composition depends on the temperature range where the component will operate.

Aside from strict shape recovery, any active material that can be made to linearly expand or contract may be used to produce a bending actuator by combining this active material with a non-active elastic member. In the literature, this is generally referred to as a unimorph actuator. If both components are made of the same material but made to deform in opposite directions, the material becomes a bimorph. For on demand applications, some materials may be appropriate themselves for the outer surface of the vehicle control mechanism.

Using the at least one active material that expands or contracts can induce bending to the left or right, respectively. In the bimorph either direction can also be achieved depending on orientation of the at least one active material layers. An unimorph may be created by using a shape memory alloy, conducting polymer, electrostrictive polymer, or other axially straining material, along with an elastic component that causes bending couple to be created. The elastic member can belong to many material classes including metallic alloys, polymers, and ceramics. Preferred materials are those which exhibit large elastic strain limits, and those which can efficiently store mechanical energy. Secondary considerations include those which may be easily bonded to the at least one active material, have properties that are acceptable in the working temperature range, and have adequate toughness to survive repeated actuation. A bimorph may be created for any material in which the material may be driven into both extension and compression depending on the driving signal. Ionic polymer actuators such as IPMC and conducting polymers intrinsically exhibit this effect due to the transport of ionic species that cause swelling across a membrane. Therefore, these materials are preferably used for this type of deformation.

Electroactive polymers include those polymeric materials that exhibit piezoelectric, pyroelectric, or electrostrictive properties in response to electrical or mechanical fields. An example of an electrostrictive-grafted elastomer with a piezoelectric poly(vinylidene fluoride-trifluoro-ethylene) copolymer. This combination has the ability to produce a varied amount of ferroelectric-electrostrictive molecular composite systems.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity—(for large or small deformations), a high dielectric constant, and the like. In one embodiment, the polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thicknesses suitable for these thin films may be below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present disclosure may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

Suitable piezoelectric materials include, but are not intended to be limited to, inorganic compounds, organic compounds, and metals. With regard to organic materials, all of the polymeric materials with non-centrosymmetric structure and large dipole moment group(s) on the main chain or on the side-chain, or on both chains within the molecules, can be used as suitable candidates for the piezoelectric film. Exemplary polymers include, for example, but are not limited to, poly(sodium 4-styrenesulfonate), poly(poly(vinylamine) backbone azo chromophore), and their derivatives; polyfluorocarbons, including polyvinylidenefluoride, its co-polymer vinylidene fluoride ("VDF"), co-trifluoroethylene, and their derivatives; polychlorocarbons, including poly(vinyl chloride), polyvinylidene chloride, and their derivatives; polyacrylonitriles, and their derivatives; polycarboxylic acids, including poly(methacrylic acid), and their-derivatives; polyureas, and their derivatives; polyurethanes, and their derivatives; bio-molecules such as poly-L-lactic acids and their derivatives, and cell membrane proteins, as well as phosphate bio-molecules such as phosphodilipids; polyanilines and their derivatives, and all of the derivatives of tetramines; polyamides including aromatic polyamides and polyimides, including Kapton and polyetherimide, and their derivatives; all of the membrane polymers; poly(N-vinyl pyrrolidone) (PVP) homopolymer, and its derivatives, and random PVP-co-vinyl acetate copolymers; and all of the aromatic polymers with dipole moment groups in the main-chain or side-chain is, or in both the main-chain and the side-chains, and mixtures thereof.

Piezoelectric material can also comprise metals selected from the group consisting of lead, antimony, manganese, tantalum, zirconium, niobium, lanthanum, platinum, palladium, nickel, tungsten, aluminum, strontium, titanium, barium, calcium, chromium, silver, iron, silicon, copper, alloys, comprising at least one of the foregoing metals, and oxides comprising at least one of the foregoing metals. Suitable metal oxides include $SiO_2$, $Al_2O_3$, $ZrO_2$, $TiO_2$, $SrTiO_3$, $PbTiO_3$, $BaTiO_3$, $FeO_3$, $Fe_3O_4$, $ZnO$, and mixtures thereof and Group VIA and IIB compounds, such as CdSe, CdS, GaAs, $AgCaSe_2$, ZnSe, GaP, InP, ZnS, and mixtures thereof. Preferably, the piezoelectric material is selected from the group consisting of polyvinylidene fluoride, lead zirconate titanate, and barium titanate, and mixtures thereof.

Suitable magnetorheological fluid materials include, but are not intended to be limited to, ferromagnetic or paramagnetic particles dispersed in a carrier fluid. Suitable particles include iron; iron alloys, such as those including aluminum, silicon, cobalt, nickel, vanadium, molybdenum, chromium, tungsten, manganese and/or copper; iron oxides, including $Fe_2O_3$ and $Fe_3O_4$; iron nitride; iron carbide; carbonyl iron; nickel and alloys of nickel; cobalt and alloys of cobalt; chromium dioxide; stainless steel; silicon steel; and the like. Examples of suitable particles include straight iron powders, reduced iron powders, iron oxide powder/straight iron powder mixtures and iron oxide powder/reduced iron powder mixtures. A preferred magnetic-responsive particulate is carbonyl iron, more preferably, reduced carbonyl iron.

The particle size should be selected so that the particles exhibit multi-domain characteristics when subjected to a magnetic field. Diameter sizes for the particles can be less than or equal to about 1,000 micrometers, with less than or equal to about 500 micrometers preferred, and less than or equal to about 100 micrometers more preferred. Also preferred is a particle diameter of greater than or equal to about 0.1 micrometer, with greater than or equal to about 0.5 more preferred, and greater than or equal to about 10 micrometers especially preferred. The particles are preferably present in an amount between about 5.0 to about 50 percent by volume of the total MR fluid composition.

Suitable carrier fluids include organic liquids, especially non-polar organic liquids. Examples include, but are not limited to, silicone oils; mineral oils; paraffin oils; silicone copolymers; white oils; hydraulic oils; transformer oils; halogenated organic liquids, such as chlorinated hydrocarbons, halogenated paraffins, perfluorinated polyethers and fluorinated hydrocarbons; diesters; polyoxyalkylenes; fluorinated silicones; cyanoalkyl siloxanes; glycols; synthetic hydrocarbon oils, including both unsaturated and saturated; and combinations comprising at least one of the foregoing fluids.

The viscosity of the carrier component can be less than or equal to about 100,000 centipoise, with less than or equal to about 10,000 centipoise preferred, and less than or equal to about 1,000 centipoise more preferred. Also preferred is a viscosity of greater than or equal to about 1 centipoise, with greater than or equal to about 250 centipoise preferred, and greater than or equal to about 500 centipoise especially preferred.

Aqueous carrier fluids may also be used, especially those comprising hydrophilic mineral clays such as bentonite or hectorite. The aqueous carrier fluid may comprise water or water comprising a small amount of polar, water-miscible organic solvents such as methanol, ethanol, propanol, dimethyl sulfoxide, dimethyl formamide, ethylene carbonate, propylene carbonate, acetone, tetrahydrofuran, diethyl ether, ethylene glycol, propylene glycol, and the like. The amount of polar organic solvents is less than or equal to about 5.0% by volume of the total MR fluid, and preferably less than or equal to about 3.0%. Also, the amount of polar organic solvents is preferably greater than or equal to about 0.1%, and more preferably greater than or equal to about 1.0% by volume of the total MR fluid. The pH of the aqueous carrier fluid is preferably less than or equal to about 13, and preferably less than or equal to about 9.0. Also, the pH of the aqueous carrier fluid is greater than or equal to about 5.0, and preferably greater than or equal to about 8.0.

Natural or synthetic bentonite or hectorite may be used. The amount of bentonite or hectorite in the MR fluid is less than or equal to about 10 percent by weight of the total MR fluid, preferably less than or equal to about 8.0 percent by weight, and more preferably less than or equal to about 6.0 percent by weight. Preferably, the bentonite or hectorite is present in greater than or equal to about 0.1 percent by weight, more preferably greater than or equal to about 1.0 percent by weight, and especially preferred greater than or equal to about 2.0 percent by weight of the total MR fluid.

Optional components in the MR fluid include clays, organoclays, carboxylate soaps, dispersants, corrosion inhibitors, lubricants, extreme pressure anti-wear additives, antioxidants, thixotropic agents and conventional suspension agents. Carboxylate soaps include ferrous oleate, ferrous naphthenate, ferrous stearate, aluminum di- and tri-stearate, lithium stearate, calcium stearate, zinc stearate and sodium stearate, and surfactants such as sulfonates, phosphate esters, stearic acid, glycerol monooleate, sorbitan sesquioleate, laurates, fatty acids, fatty alcohols, fluoroaliphatic polymeric esters, and titanate, aluminate and zirconate coupling agents and the like. Polyalkylene diols, such as polyethylene glycol, and partially esterified polyols can also be included.

Suitable MR elastomer materials include, but are not intended to be limited to, an elastic polymer matrix comprising a suspension of ferromagnetic or paramagnetic particles, wherein the particles are described above. Suitable polymer matrices include, but are not limited to, poly-alpha-olefins, natural rubber, silicone, polybutadiene, polyethylene, polyisoprene, and the like.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A control mechanism, comprising:
   a first electrical contact;
   a second electrical contact;
   a control member, wherein actuation of the control member causes the first and second electrical contacts to contact one another;
   a blocking element comprising an active material sufficiently mounted with respect to the control member to selectively resist actuation of the control member, wherein the active material is adapted to change at least one attribute in response to an activation signal;
   an activation device in operative communication with the active material adapted to provide the activation signal, wherein the change in the at least one attribute changes a modulus property of the blocking element and changes a force level for actuating the control member; and
   a controller in operative communication with the activation device and configured to selectively cause the activation device to transmit the activation signal to the active material.

2. The control mechanism of claim 1, wherein the active material comprises a shape memory polymer, a shape memory alloy, a magnetic shape memory alloy, an electroactive polymer, a magnetorheological elastomer, a magnetorheological fluid, an electrorheological fluid, electrorheological elastomer, an ionic polymer metal composite, a piezoelectric, or a combination comprising at least one of the foregoing active materials.

3. The control mechanism of claim 1, wherein the blocking element is a membrane formed of the active material.

4. The control mechanism of claim 1, wherein the blocking element is a spring formed of the active material.

5. The control mechanism of claim 1, wherein the change in the force level for actuating the control member decreases upon receipt of the activation signal.

6. The control mechanism of claim 1, wherein the control member is one of a depressible button, a toggle, a knob, a switch, a latch, and combinations thereof.

7. The control mechanism of claim 1, wherein the activation signal is a selected one of a thermal signal, an electrical signal, a magnetic signal, a mechanical signal, a chemical signal, and a combination comprising at least one of the foregoing signals.

8. The control mechanism of claim 1, wherein the change in the at least one attribute is reversible.

9. The control mechanism of claim 1, wherein the modulus property of the blocking element in an unpowered state is effective to prevent actuation of the control member up to a predetermined forced level.

10. The control mechanism of claim 1, wherein the control member is disposed in a vehicle for controlling the function.

11. The control mechanism of claim 1, wherein the blocking element defines a linkage between the tactile control and the electrical circuit.

12. A process for selectively adjusting a force level for a control member in operative communication with an electrical circuit, wherein actuation of the control member closes the electrical circuit to activate a function, the process comprising:

selectively changing a modulus property of a blocking element by applying an activation signal, wherein the blocking element comprises an active material operatively connected to the control member to selectively resist the actuation of the control member, wherein the active material is adapted to change the modulus property in response to the activation signal.

13. The process of claim 12, wherein the active material comprises a shape memory polymer, a shape memory alloy, a magnetic shape memory alloy, an electroactive polymer, a magnetorheological elastomer, a magnetorheological fluid, an electrorheological fluid, electrorheological elastomer, an ionic polymer metal composite, a piezoelectric, or a combination comprising at least one of the foregoing active materials.

14. The process of claim 12, wherein changing the modulus property actuates the control member.

15. The process of claim 12, wherein changing the modulus property does not actuate the control member.

16. The process of claim 12, wherein selectively changing the modulus property of the active material is reversible.

17. The process of claim 12, wherein the modulus property of the blocking element in an unpowered state is effective to prevent actuation of the control member up to a predetermined forced level.

18. The process of claim 12, wherein actuating the control member performs a vehicle function.

19. The process of claim 12, wherein the blocking element exhibits a fail-safe mode, wherein the fail-safe mode passively changes the modulus property.

20. The process of claim 12, wherein the modulus property of the blocking element in an unpowered state is effective to prevent actuation of the control member.

21. The process of claim 12, wherein lowering the modulus property of the blocking element does not actuate the control member.

* * * * *